United States Patent [19]

Berg

[11] 4,221,399
[45] Sep. 9, 1980

[54] DRAFT ARM EXTENSION STOP

[75] Inventor: David A. Berg, Milwaukee, Wis.

[73] Assignee: Allis-Chalmers Corporation, Milwaukee, Wis.

[21] Appl. No.: 961,623

[22] Filed: Nov. 17, 1978

[51] Int. Cl.³ .............................................. B60D 1/00
[52] U.S. Cl. ................................ 280/478 R; 172/272; 172/439; 280/460 A; 403/109; 403/353
[58] Field of Search ............... 280/482, 478 R, 461 A, 280/460 A, 456 A; 403/353, 109; 172/272, 439

[56] References Cited

U.S. PATENT DOCUMENTS

| 2,396,747 | 3/1946 | Parrott | 403/353 |
| 3,643,976 | 2/1972 | Haupt et al. | 280/478 R |
| 3,853,335 | 12/1974 | Heckenkamp | 280/478 R |

Primary Examiner—John A. Pekar
Attorney, Agent, or Firm—Arthur L. Nelson

[57] ABSTRACT

A lower draft arm extension link stop in a tubular member of a lower draft arm of a three-point hitch for engaging the extension link in its extended position. The extension link is provided with a relief portion which clears the stop when the link is angular inclined so that it can be withdrawn from the tubular member. The tubular member includes a latch, axially aligned with the stop, for holding the link in its contracted position.

10 Claims, 5 Drawing Figures

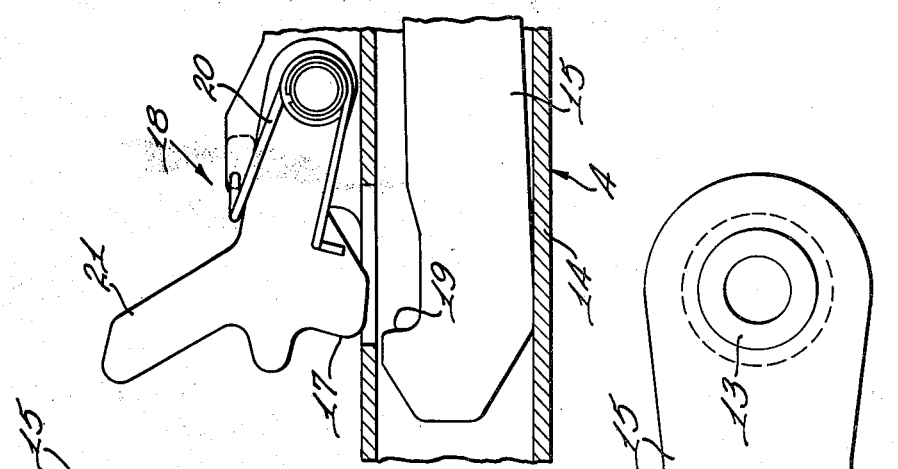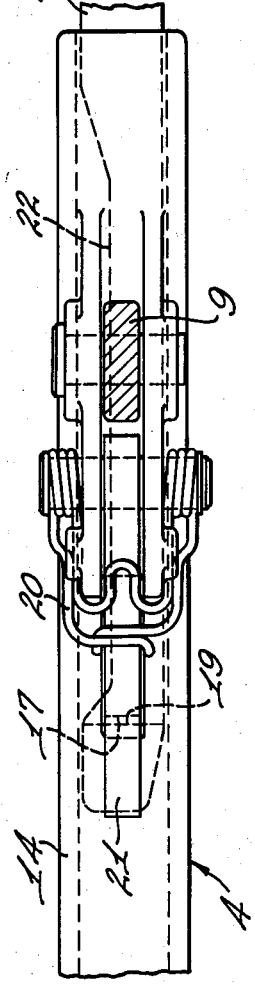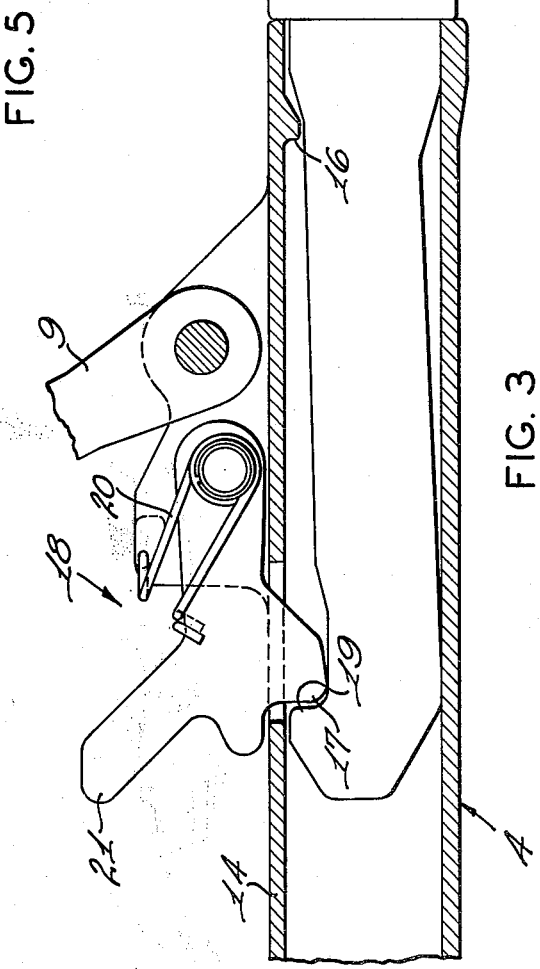

DRAFT ARM EXTENSION STOP

This invention relates to a three-point hitch and more particularly to extendible lower draft arms having a hollow member for receiving an extension link and a stop in the hollow member for engaging the extension link to operate as a safety catch and as an extended position of the lower draft arms to facilitate coupling of the implement to the tractor.

Coupling of a three-point hitch on a tractor to an implement requires universal connection of the lower draft arms and the upper link with the tractor to permit lateral movement of the lower draft arms and the upper link. Limited movement fore and aft is also usually necessary in order to connect the lower draft arms to the implement. Accordingly, extensions are provided on conventional links which will permit the operator to position the tractor relatively close to the implement and then release the latch on the extension of the lower draft arms to allow the lower draft arms to be extended. This movement will accommodate connection of the implement with the lower draft arms. Once the implement is connected, the tractor can be moved forwardly to align the implement with the tractor and then to contract the lower draft arms to provide connection of the upper link to complete the coupling between the implement and the tractor.

Conventionally, a latch is provided on the lower draft arms in their contracted position which will lock the extension in the draft arm in the contracted or operating position. The latch can be released to permit the lower draft arms to be extended, however, a safety latch is usually provided to avoid the extension link from becoming completely separated from the hollow portion of the lower draft arms on the tractor.

Accordingly, this invention provide for a safety catch or abutment in the lower draft arms to engage the extension link and prevent it from becoming completely disassembled from the lower draft arms. The abutment is cast integral in the rear end of a cast steel hollow draft arm member which engages the hook on the front end of the extension link to normally prevent them from becoming completely disassembled. A clearance on the hook of the extension link is also provided so that they can be assembled when the link is in the angled or somewhat vertical position relative to the hollow member of the lower draft arms. Once the hook is moved forwardly of the abutment, the extension link is lowered to a coaxial position with the hollow draft arm and then moved forwardly to latch in the engaged and contracted position.

Accordingly, it is an object of this invention to provide an extendible draft arm on a three-point hitch.

It is a further object of this invention to provide an extendible lower draft arm having a hollow member receiving an extension link for selectively engaging a latch in the contracted position and an abutment of the hollow member in the extended position as a safety catch in the lower draft arm.

It is a further object of this invention to provide an abutment in a hollow member of the lower draft arms for engaging an extension link in the extended position of the lower draft arms of a three-point hitch. The abutment provides a safety catch for the extension link of the lower draft arms and facilitates coupling of the three-point hitch on the tractor with an implement. The extension link and the hollow member of the lower draft arms are provided with clearance to allow lateral movement of the extension link relative to the hollow member of the lower draft arms and a means for extension of the extension link relative to the hollow draft arms to facilitate coupling of the implement to the tractor. Once the extension link is coupled to the tractor, the lower draft arms are contracted to the contracted or operating position.

The objects of this invention are provided in an extendible lower draft arm in which a hollow draft arm member is universally connected to the tractor on its forward end. The hollow draft member is formed with a central opening for receiving an extension link which can be contracted in the hollow member to engage a latch to retain the extension link in the operating position. A safety catch is provided by an abutment in the hollow draft arm which engages a hook on the extension link to operate as a safety catch if the latch is released. The abutment is formed in a cast steel hollow draft arm and is formed integral therewith. The extension link is formed of forged steel with a link to engage the abutment when in an extended position within the hollow member of the lower draft arms. The extension link can be removed or assembled with the hollow draft arm by tilting the extension link angularly relative to the lower draft arm in a somewhat vertical position to clear the abutment.

Referring to the drawings, the preferred embodiment of this invention is illustrated.

FIG. 3 is a cross section view showing the extension link in the contracted operating position in which the latch engages the hook on the forward end of the extension link.

FIG. 4 is a partial cross section view showing the plan view of FIG. 3.

FIG. 5 is a cross section view of the latch in the released position and the hollow member of the lower draft arms receiving the extension link.

Figure 1:
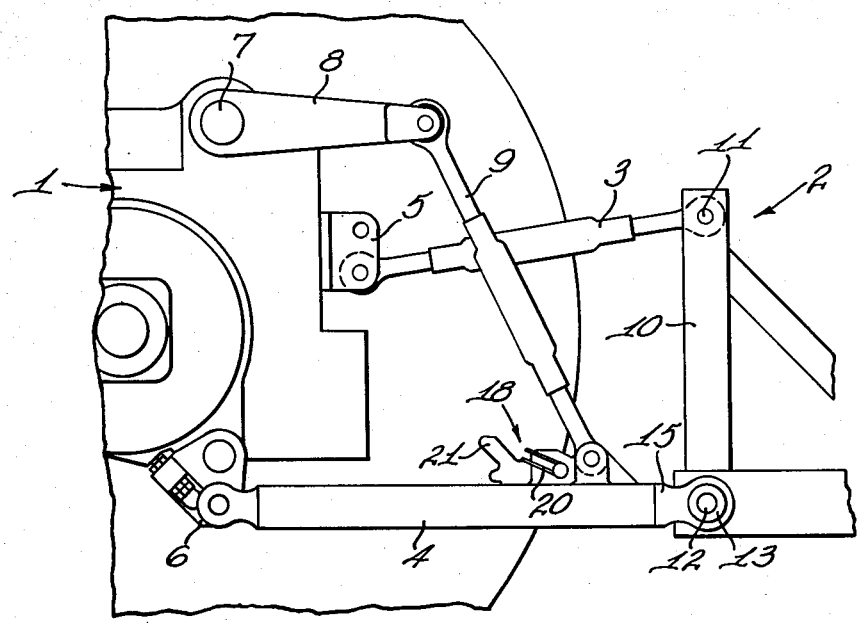
FIG. 1 is a side elevation view of a three-point hitch on the tractor.

Referring to the drawings, the preferred embodiment of this invention is illustrated.

FIG. 1 shows the tractor 1 with a three-point hitch 2 including the upper link 3 and one of the lower draft arms 4. The upper link 3 is connected by a universal bearing 5 while the lower draft arms are connected by universal bearings 6 on the forward end to permit vertical and lateral movement of the link and arms. The rock shaft 7 carries the rock arms 8 which are pivotally connected to the lift link 9 which in turn is pivotally connected to the lower draft arms 4. The upper link 3 is pivotally connected to the mast 10 of the implement through the pin 11 while the lower draft arms 4 are connected through the pin 12 and spherical bushing 13 to the lower portion of the implement mast 10.

Figure 2:
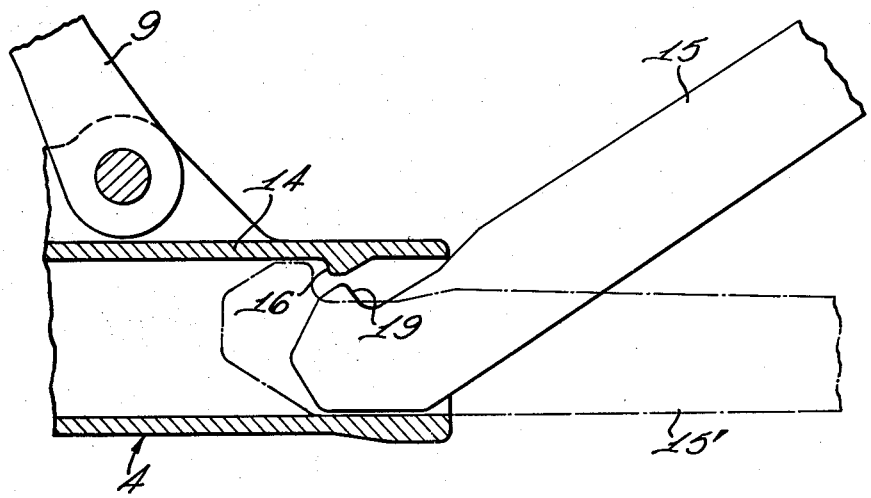
FIG. 2 is a cross section view showing the hollow member of the lower draft arms and the extension link in the position permitting assembly of the two elements.

FIG. 2 illustrates a cross section view of the hollow member 14 of the lower draft arms 4 receiving the extension link 15. The extension link 15 is positioned diagonally to the hollow member 14 to permit the extension link 15 to clear the abutment 16 in the hollow draft member 14. This is the position for assembly of the extension link in the hollow member 14. As the extension link is moved forwardly it clears the abutment 16 and then pivots to a central position as it telescopes forwardly within the hollow member 14.

FIGS. 3, 4 and 5 illustrate the assembled position of the extension link 15 in the hollow member 14 of the lower draft arms 4. FIG. 3 is a cross section view showing the extension link 15 coaxially aligned within the hollow member 14 and contracted to the operating position. The engaging surface 17 of the latch 18 is engaging the hook 19 on the forward end of the extension link. A spring 20 normally biases the latch 18 to an engaging position with the hook 19. The handle 21 can be lifted against the biasing force 20 to release the extension link 15 as shown in FIG. 5. When the latch 18 is in the raised position, the extension link 15 is free to be withdrawn from the assembly except for the abutment 16 which will engage the hook 19 to prevent it from being completely withdrawn from the hollow member 14. This position is shown in FIG. 2 in the phantom view in which the extension member 15' is shown in the engaging position with the abutment 16. Normally, the extension link 15 will be in a horizontal position and the implement will not be in an elevated position relative to the tractor and the abutment will operate as a safety catch for the extension link 15. Normally, the lower draft arms are operated in the position as shown in FIG. 3. However, if it is extended to the position shown in FIG. 2, 15', it can be maneuvered tranversely because of the recess 22 shown in the side of the extension link 15. When the extension link 15 is in the position 15' as shown in FIG. 2, the recessed portion 22 will allow the extension link to move laterally relative to the hollow member 14. Normally, the universal bearing connection on the forward end of the lower draft arms will permit the lower draft arms to pivot laterally to the left as viewed in FIG. 4 because of the universal bearing connected on the forward end of the lower draft arms.

The operation of the device will be described in the following paragraphs.

The extension link 15 is shown in the position for assembling the extension link within the hollow draft member 14. The extension link 15 is moved forwardly until it clears the abutment 16 and then moves downwardly into a coaxial aligned position as shown in the phantom view 15'. In this position, the extension link 15 can be contracted as the extension link 15 moves forwardly to engage the latch 18 in the normal operating position of the lower draft arms 4 on the tractor. In the normal operating position, the latch 18 holds the extension link 15 in its contracted position and is connected through a pin 12 and the spherical bushing to the implement 13.

When the extension link 15 is extended or withdrawn from the hollow member 14, the latch 18 is moved to the unlatched position as shown in FIG. 5. The extension link 15 can then be withdrawn from the hollow draft member 14 where it engages the abutment 16 as shown in the phantom view 15' of FIG. 2. Normally, this is a safety catch for the extension link 15 preventing the extension link from being completely withdrawn from the hollow member 14. If, however, it is desired to remove the extension link 15 from the hollow member 14, it can be raised to the position as shown of the extension link 15 in FIG. 2 and then withdrawn rearwardly to disassemble the extension link 15 from the hollow member 14 of the lower draft arms 4.

The embodiments of the invention in which an exclusive property or privilege is claimed are defined as follows:

1. An extendible lower draft arm of a three-point hitch on a tractor comprising, a hollow member adapted for universal connection to a tractor, an extension link slidably mounted in said hollow member, hook means formed on the forward end of said extension link, a latch on said hollow member for engaging said hook means when said draft arm is in the contracted position, an abutment formed on the inner portion of said hollow member axially aligned with said latch for engaging said hook means in an extended position of said lower draft arm, said extension link defining a sufficient thickness to hold said hook means in an engaging position with said latch when said extension link is in the contracted position of said hollow member, relief means on said hook means permitting insertion of said extension link in said hollow member by clearing said abutment when said extension link is angularly inclined relative to said hollow member, said hollow member thereby permitting said extension link to telescope within said hollow member to engage said latch on said lower draft arm in the normally contracted position.

2. An extendible lower draft arm of a three-point hitch on a tractor as set forth in claim 1 including cast steel construction forming said hollow member.

3. An extendible lower draft arm of a three-point hitch on a tractor as set forth in claim 1 wherein said abutment defines an integral structure with said hollow member.

4. An extendible lower draft arm of a three-point hitch on a tractor as set forth in claim 1 wherein said extension link defines a recessed portion permitting transverse movement of said extension link in the partially extended and extended position in said hollow member.

5. An extendible lower draft arm of a three-point hitch on a tractor as set forth in claim 1 including means normally biasing said latch to the latched position for engaging said hook means on said extension link.

6. An extendible lower draft arm of a three-point hitch on a tractor as set forth in claim 1 wherein said hollow member defines a rectangular cross section, said extendible link defines a rectangular cross section for reception within said hollow draft member.

7. An extendible lower draft arm of a three-point hitch on a tractor as set forth in claim 1 wherein said hook means defines a diagonal surface permitting an inclined angular position of said extension link relative to said hollow member to permit said hook means to clear said abutment as said extension link is initially inserted in said hollow member and moved beyond said abutment.

8. An extendible lower draft arm of a three-point hitch on a tractor as set forth in claim 1 wherein said hollow member defines a rectangular cross section of the hollow portion of said hollow member and said abutment defining an integral cast structure on an inner surface of said hollow member.

9. An extendible lower draft arm of a three-point hitch on a tractor as set forth in claim 1 wherein hollow member defines said abutment on the upper and inner surface and inner periphery of said hollow member of said lower draft arm.

10. An extendible lower draft arm of a three-point hitch on a tractor as set forth in claim 1 wherein said extension link comprises forged steel and said hollow member comprises cast steel.

* * * * *